United States Patent
Rodriguez et al.

(10) Patent No.: US 11,053,857 B2
(45) Date of Patent: *Jul. 6, 2021

(54) AIR TURBINE STARTER WITH DECOUPLER

(71) Applicant: GE AVIATION SYSTEMS LLC, Grand Rapids, MI (US)

(72) Inventors: Eliel Fresco Rodriguez, Springboro, OH (US); David Allan Dranschak, Union, OH (US); Shiloh Montegomery Emerson Meyers, Dayton, OH (US); Harsha Sanjeewa Bulathsinghalage, Miamisburg, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,997

(22) Filed: Feb. 12, 2020

(65) Prior Publication Data

US 2020/0182156 A1 Jun. 11, 2020

Related U.S. Application Data (63) Continuation of application No. 15/180,728, filed on Jun. 13, 2016, now Pat. No. 10,584,640.

(51) Int. Cl.
| | | |
|---|---|---|
| *F02C 7/277* | (2006.01) | |
| *F02C 7/36* | (2006.01) | |
| *F16D 9/08* | (2006.01) | |
| *F02C 7/275* | (2006.01) | |
| *F02C 7/268* | (2006.01) | |
| *F02C 7/32* | (2006.01) | |

(52) U.S. Cl.
CPC .............. *F02C 7/277* (2013.01); *F02C 7/268* (2013.01); *F02C 7/275* (2013.01); *F02C 7/32* (2013.01); *F02C 7/36* (2013.01); *F16D 9/08* (2013.01); *F05D 2220/32* (2013.01); *F05D 2260/85* (2013.01)

(58) Field of Classification Search
CPC .. F02C 7/277; F02C 7/32; F02C 7/275; F02C 7/268; F02C 7/36; F16D 9/08; F16D 9/04; F16D 9/06; F16D 2500/1025; F05D 2260/85; F05D 2220/32; F05D 2240/60; F05D 2240/61; F01D 5/026
See application file for complete search history.

(56) References Cited

U.S. PATENT DOCUMENTS

| | | |
|---|---|---|
| 2,602,335 A | 7/1952 | Miller |
| 2,951,570 A | 9/1960 | Antrim, Jr. et al. |
| 2,964,931 A | 12/1960 | Sorenson |
| 3,220,218 A | 11/1965 | Rio et al. |
| 4,281,942 A | 8/1981 | Gaeckle et al. |

(Continued)

FOREIGN PATENT DOCUMENTS

FR 2887945 A1 1/2007

*Primary Examiner* — Courtney D Heinle
*Assistant Examiner* — Danielle M. Christensen
(74) *Attorney, Agent, or Firm* — McGarry Bair PC (57) ABSTRACT

A method and decoupler for disengaging an output shaft from an engine in a back drive event with a backdrive decoupler. The backdrive decoupler includes a an output shaft, drive shaft, and a retention mechanism selectively coupling the output shaft to the drive shaft. In a backdrive event, the decoupler decouples the output shaft from the drive shaft.

20 Claims, 8 Drawing Sheets

(56) References Cited

U.S. PATENT DOCUMENTS

| | | | |
|---|---|---|---|
| 4,543,074 A * | 9/1985 | Ville | F16D 9/06 |
| | | | 192/56.53 |
| 4,601,591 A | 7/1986 | Wright | |
| 4,768,634 A | 9/1988 | Quick et al. | |
| 4,871,296 A | 10/1989 | Laessle et al. | |
| 6,059,085 A | 5/2000 | Farnsworth | |
| 7,318,685 B2 * | 1/2008 | Bouchy | F01D 21/045 |
| | | | 403/2 |
| 8,105,018 B2 | 1/2012 | Gockel et al. | |
| 2007/0000746 A1 | 1/2007 | Guyader | |

* cited by examiner

AIR TURBINE STARTER WITH DECOUPLER

The present application is a continuation of U.S. patent application Ser. No. 15/180,728, filed Jun. 13, 2016, now U.S. Pat. No. 10,584,640, issued Mar. 10, 2020, which is incorporated herein by reference in its entirety.

BACKGROUND OF THE INVENTION

A driving mechanism, such as a motor or engine, can generate driving motions at a mechanism output, such as at a rotatable output shaft. The output shaft can, for example, provide a rotational kinetic motion to another piece of equipment via a rotatable drive shaft connected to the output shaft. The piece of equipment receiving the rotational kinetic motion can utilize the driving rotational motion as an energy source to operate. In one example configuration, a gas turbine engine, also known as a combustion turbine engine, is a rotary engine that extracts energy from a flow of combusted gases passing through the engine onto a multitude of turbine blades. The gas turbine engine can provide at least a portion of the rotational kinetic motion to rotating equipment, such as an accessory gearbox, where the rotational motion is utilized to power a number of different accessories. The accessories can include generators, starter/generators, permanent magnet alternators (PMA) or permanent magnet generators (PMG), fuel pumps, and hydraulic pumps. In the event of failure of the driving mechanism, it can be desirable to decouple the driving mechanism from the rotating equipment.

BRIEF DESCRIPTION OF THE INVENTION

In one aspect, the present disclosure relates to a decoupler assembly for decoupling an output shaft of a starter motor during backdrive, comprising a fuse having a first end operably coupled to a drive shaft of the starter motor, a threaded portion receivable within an internal threaded portion of the output shaft of the starter motor, and a neck portion located between the first end and the threaded portion; wherein when an the threaded portion of the fuse is unwound from the internal threaded portion in a direction away from the drive shaft.

In another aspect, the present disclosure relates to an air turbine starter for starting an engine, comprising a housing defining an inlet, an outlet, and a flow path extending between the inlet and the outlet for communicating a flow of gas therethrough; a turbine member journaled within the housing and disposed within the flow path for rotatably extracting mechanical power from the flow of gas; a gear train drivingly coupled with the turbine member; a clutch having a drive shaft operably coupled with the gear train; and a decoupler, comprising: a tensile fuse having a first end operably coupled to the drive shaft, a threaded portion, and a neck portion; and an output shaft having a first end selectively operably coupled to the drive shaft, a second end configured to be operably coupled to and rotate with the engine, and an internal threaded portion that receives the threaded portion of the tensile fuse; wherein when an overrunning torque reaches a certain level the threaded portion of the tensile fuse is unwound from the internal threaded portion in a direction away from the drive shaft.

In yet another aspect, the present disclosure relates to a method for operating a starter motor, comprising extracting mechanical power from a flow of gas utilizing a turbine and driving a gear train and clutch having a drive shaft therewith; transmitting a driving torque from the drive shaft to an output shaft operably coupled to an engine; and during back driving, activating a backdrive decoupler wherein a tensile fuse operably coupled to the output shaft and the drive shaft is unwound from the output shaft and translated away from the drive shaft.

DETAILED DESCRIPTION OF THE EMBODIMENTS

The present invention is related to a driving mechanism generating kinetic motion in the form of a rotating shaft coupled with a piece of rotating equipment. One non-limiting example of a driving mechanism can include a gas turbine engine rotationally driving a piece of rotating equipment, such as a starter. The starter has various applications including starting a gas turbine engine and generating electrical power when the gas turbine engine is in operation. While the exemplary embodiment described herein is directed to application of a gas turbine engine and a starter, embodiments of the disclosure can be applied to any implementation of a driving mechanism that generates rotational motion at a driving output, and provides the rotational motion to another piece of rotating equipment.

Figure 1:
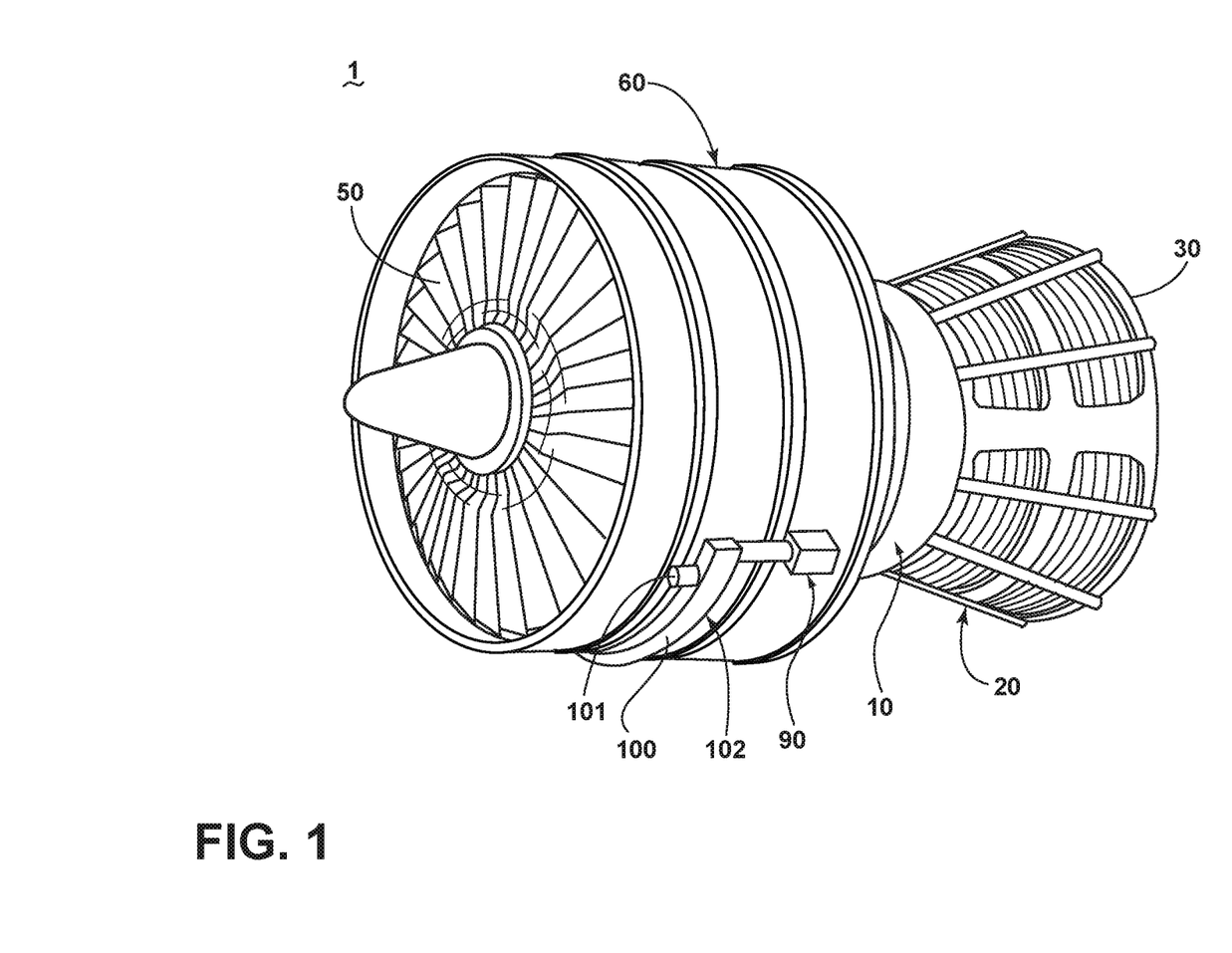
FIG. 1 is a schematic illustration of a gas turbine engine with an accessory gearbox in accordance with various aspects described herein.

Referring to FIG. 1, a starter motor or air turbine starter 102 including an accessory gear box (AGB) 100, also known as a transmission housing, are schematically illustrated as being mounted to a gas turbine engine 1. This assembly is commonly referred to as an Integrated Starter/Generator Gearbox (ISGB), or simply an air turbine starter 102. The gas turbine engine 1 comprises an air intake with a fan 50 that supplies air to a high pressure compression region 60. The air intake with a fan 50 and the high pressure compression region collectively are known as the 'cold section' of the gas turbine engine upstream of the combustion. The high pressure compression region 60 provides the combustion chamber 10 with high pressure air. In the combustion chamber, the high pressure air is mixed with fuel and combusted. The hot and pressurized combusted gas passes through a high pressure turbine region 20 and a low pressure turbine region 30 before exhausting from the gas turbine engine. As the pressurized gases pass through the high pressure turbine (not shown) of the high pressure turbine region 20 and the low pressure turbine (not shown) of the low pressure turbine region 30, the turbines extract rotational energy from the flow of the gases passing through the gas turbine engine 1. The high pressure turbine of the high pressure turbine region 20 can be coupled to the compression mechanism (not shown) of the high pressure compression region 60 by way of a shaft to power the compression mechanism. The low pressure turbine can be coupled to the fan 50 of the air intake by way of a shaft to power the fan 50.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 30 to increase the velocity of the exhausted gases, and thereby increasing thrust.

The AGB 100 is coupled to a turbine shaft of the gas turbine engine 1, either to the low pressure or high pressure turbine by way of a mechanical power take-off 90. The mechanical power take off 90 contains multiple gears and means for mechanical coupling of the AGB 100 to the gas turbine engine 1. The assembly 102 can be mounted on the outside of either the air intake region containing the fan 50 or on the core near the high pressure compression region 60.

Figure 2:
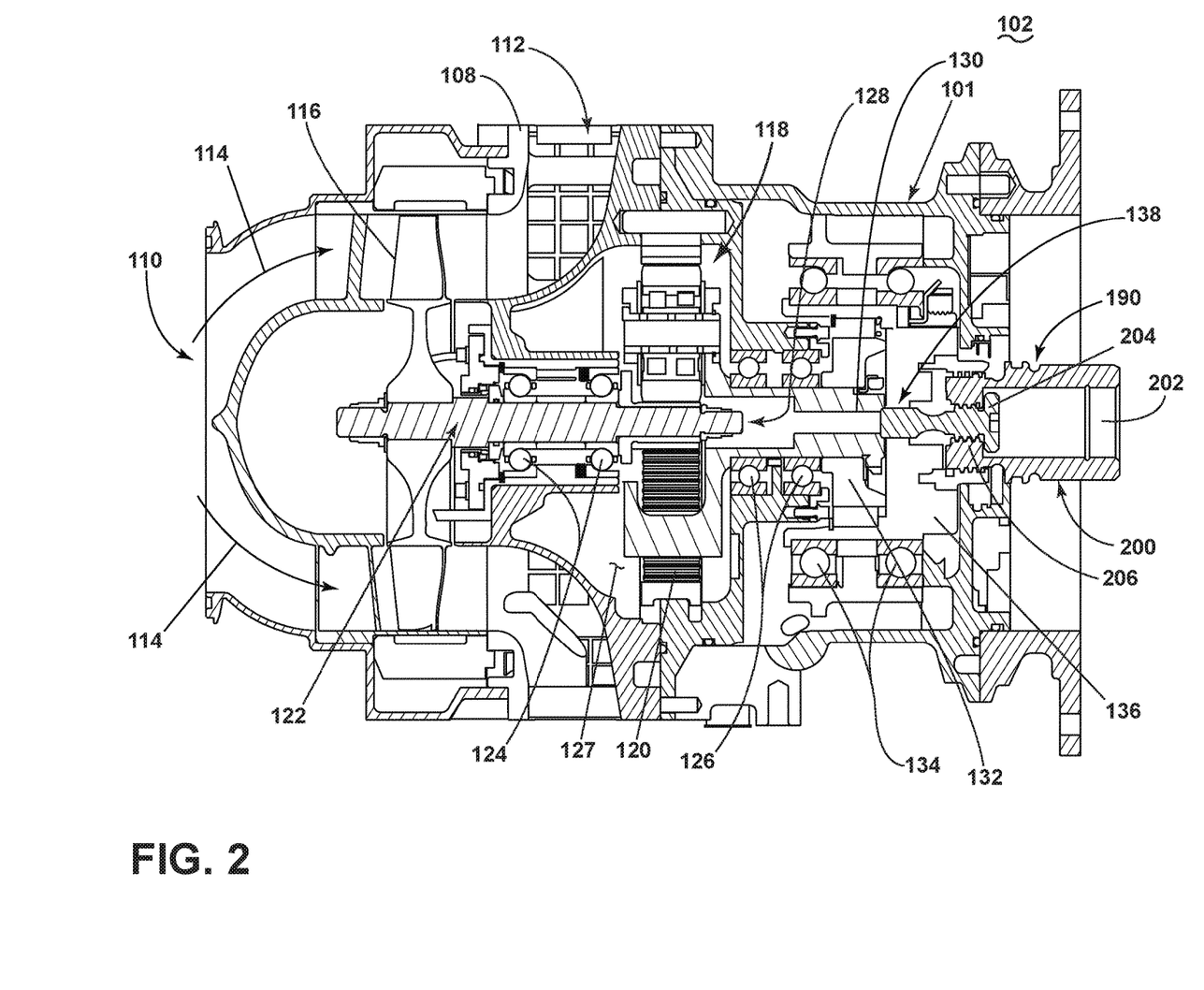
FIG. 2 is a sectional view of a starter/generator mounted to the accessory gearbox of FIG. 1 by way of a rotating shaft, in accordance with various aspects described herein.

Referring now to FIG. 2, the air turbine starter 102 is shown in greater detail. Generally, the air turbine starter 102 includes a housing 108 defining an inlet 110, an outlet 112, and a flow path 114 extending between the inlet 110 and outlet 112 for communicating a flow of gas there through. The air turbine starter 102 includes a turbine member 116 journaled within the housing 108 and disposed within the flow path 114 for rotatably extracting mechanical power from the flow of gas along the flow path 114. Further, a gear train 118, disposed within the gear box 101 and drivingly coupled with the turbine member 116, can be caused to rotate.

The gear train 118 includes a ring gear 120 and can further comprise any gear assembly including for example but not limited to a planetary gear assembly or a pinion gear assembly. A turbine shaft 122 couples the gear train 118 to the turbine member 116 allowing for the transfer of mechanical power. The turbine shaft 122 is rotatably mounted to the gear train 118 and supported by a pair of turbine bearings 124 while the gear train 118 is supported by a pair of carrier bearings 126.

A gear box interior 127 can contain oil to provide lubrication and cooling to mechanical parts contained therein such as the gear train 118, ring gear 120, and bearings 124, 126.

There is an aperture 128 through which the turbine shaft 122 extends and meshes with a carrier shaft 130 to which a clutch 132 is mounted and supported by a pair of spaced bearings 134. A drive shaft 136 extends from a portion of the gear box 101 and is coupled to the clutch 132 and additionally supported by the pair of spaced bearings 134. The drive shaft 136 is driven by the gear train 118 and coupled to the power take-off 90 of the gas turbine engine 1, such that operation of the engine 1 provides a driving motion to the gear box 101.

The clutch 132 can be any type of shaft interface portion that forms a single rotatable shaft 138 including the turbine shaft 122, the carrier shaft 130, and the drive shaft 136. The shaft interface portion can be by any known method of coupling including, but not limited to, gears, splines, a clutch mechanism, or combinations thereof. An example of a shaft interface portion 132 is disclosed in U.S. Pat. No. 4,281,942 to General Electric and is incorporated herein by reference in its entirety.

The gear box 101 and the starter 102 can be formed by any known materials and methods, including, but not limited to, die-casting of high strength and lightweight metals such as aluminum, stainless steel, iron, or titanium. The housing for the gear box 101 and starter 102 can be formed with a thickness sufficient to provide adequate mechanical rigidity without adding unnecessary weight to the assembly 102 and, therefore, the aircraft.

The rotatable shaft 138 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 122, carrier shaft 130, and drive shaft 136 can be fixed or vary along the length of the rotatable shaft 138. The diameter can vary to accommodate different sizes, as well as rotor to stator spacing.

As described herein, either the gear box 101 or the starter 102 can be a driving mechanism for driving the rotation of the rotating shafts 122, 130, 136. For example, during starting operations, the starter 102 can be the driving mechanism for rotation of the rotating shafts 122, 130, 136. Alternatively, during normal gas turbine engine 1 operation, the gear box 101 can be the driving mechanism for rotation of the rotating shafts 122, 130, 136. The non-driving mechanism, that is, the equipment being driven by the driving mechanism, can be understood as rotating equipment utilizing the rotational movement of the rotating shafts 122, 130, 136, for example to generate electricity in the starter 102.

The drive shaft 136 is further coupled to a decoupler assembly 190 including a backdrive decoupler 200 having an output shaft 202, configured to be operably coupled to and rotate with the engine 1, and a tensile fuse 204. The tensile fuse 204 is selectively receivable and axially moveable within an internal threaded portion 206, that can be for example a helical female thread, of the output shaft 202. All joining parts can be formed from steel or like materials.

Figure 3:
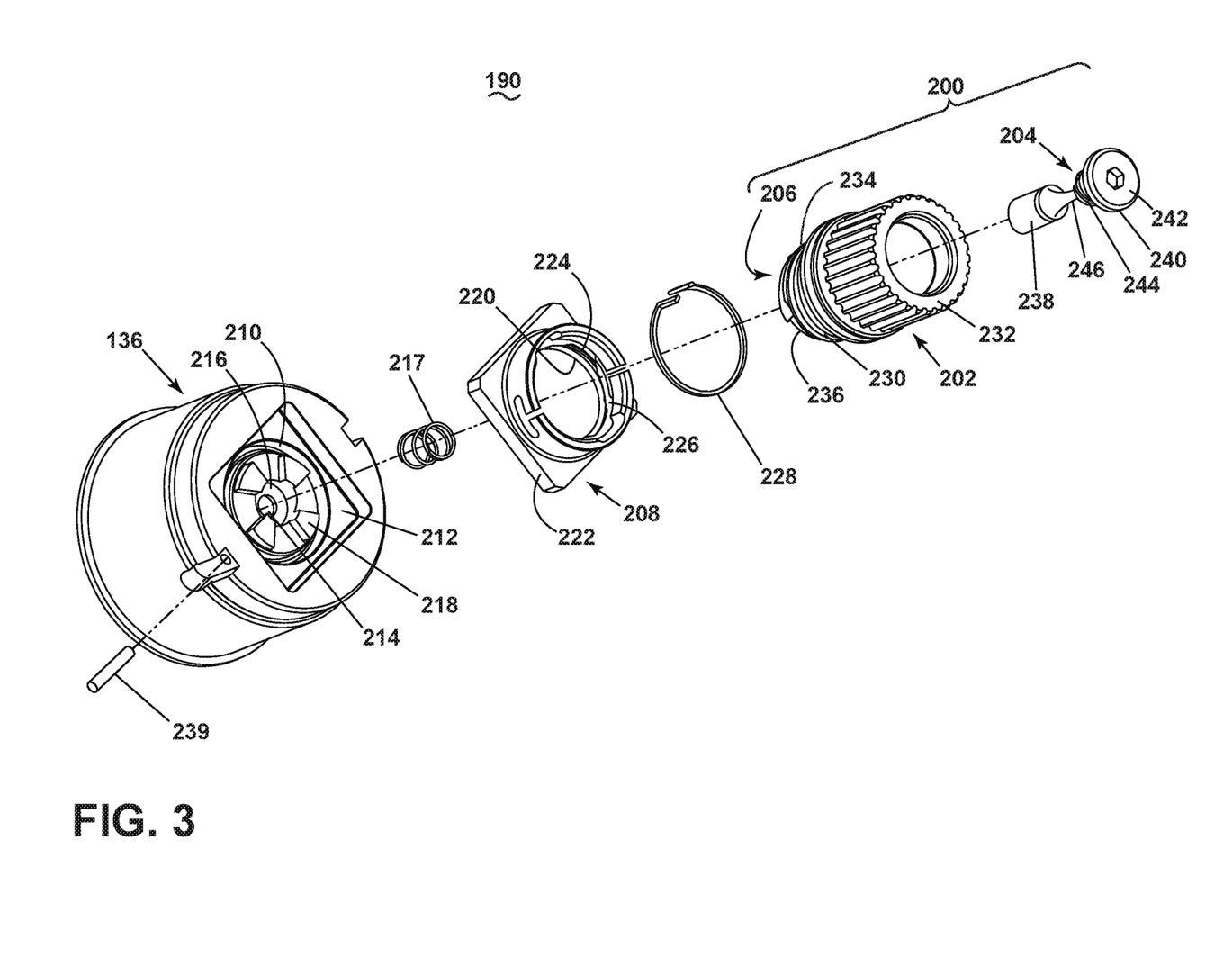
FIG. 3 is an exploded view of a decoupler adapted for use with the starter/generator of FIG. 2 in accordance with various aspects described herein.

FIG. 3 illustrates an exploded perspective view of one exemplary embodiment of the decoupler assembly 190 including the backdrive decoupler 200 and the drive shaft 136. The drive shaft 136 can include a circular depression 210 and an orthogonal depressions 212. The circular depression 210 is surrounded by the orthogonal depression 212. A central opening 214 is bound by a circular lip 216. Circumscribing the circular lip 216 are a plurality of stops 218.

A thread insert 208 can be included in the decoupler assembly 190 and is illustrated as including a complementary circular protrusion 220 and orthogonal portion 222 formed to fit into the circular and orthogonal shaped depressions 210, 212 of the drive shaft 136. The thread insert 208 further includes an internal helical threaded portion 224 which can be for example but not limited to a three helical female thread.

The decoupler assembly 190 can also include a compression spring 217 and a ring spring 228.

The output shaft 202 includes a first end 230 having an exteriorly threaded portion 234. The exteriorly threaded portion 234 can include, but is not limited to, a helical male thread, with a proximal end including complementary stops 236. A second end 232 is configured to be operably coupled to and rotate with the engine 1.

The tensile fuse 204 includes a cylindrical first end 238. A second end 240 of the tensile fuse 204 includes a head 242 and a threaded portion 244 that can be, for example, a helical male thread, disposed beneath the head 242. The tensile fuse 204 further includes a neck portion 246 having a reduced diameter between the first end 238 and the threaded portion 244.

The cylindrical first end 238 is received in the central opening 214 where a retainer pin 239 retains the first end 238 of the tensile fuse 204 within the drive shaft 136 operably coupling the tensile fuse 204 to the drive shaft 136. At assembly the tensile fuse 204 can be drilled and pinned with the retainer pin 239. The threaded portion 244 disposed beneath the head 242 is received within the internal threaded portion 206 of the output shaft 202

The exteriorly threaded portion 234 of the output shaft 202 and the internal threaded portion 206 of the tensile fuse 204 are formed so that the tensile fuse 204 is threaded into the output shaft 202 with an opposite hand turn compared to when the output shaft 202 is threaded into the thread insert 208. The stops 218 and complementary stops 236 decrease axial loads along the threaded portions, 206, 224, 234, 244 when the output shaft 202 is fully threaded into the thread insert 208 of the drive shaft 136.

Figure 4A:
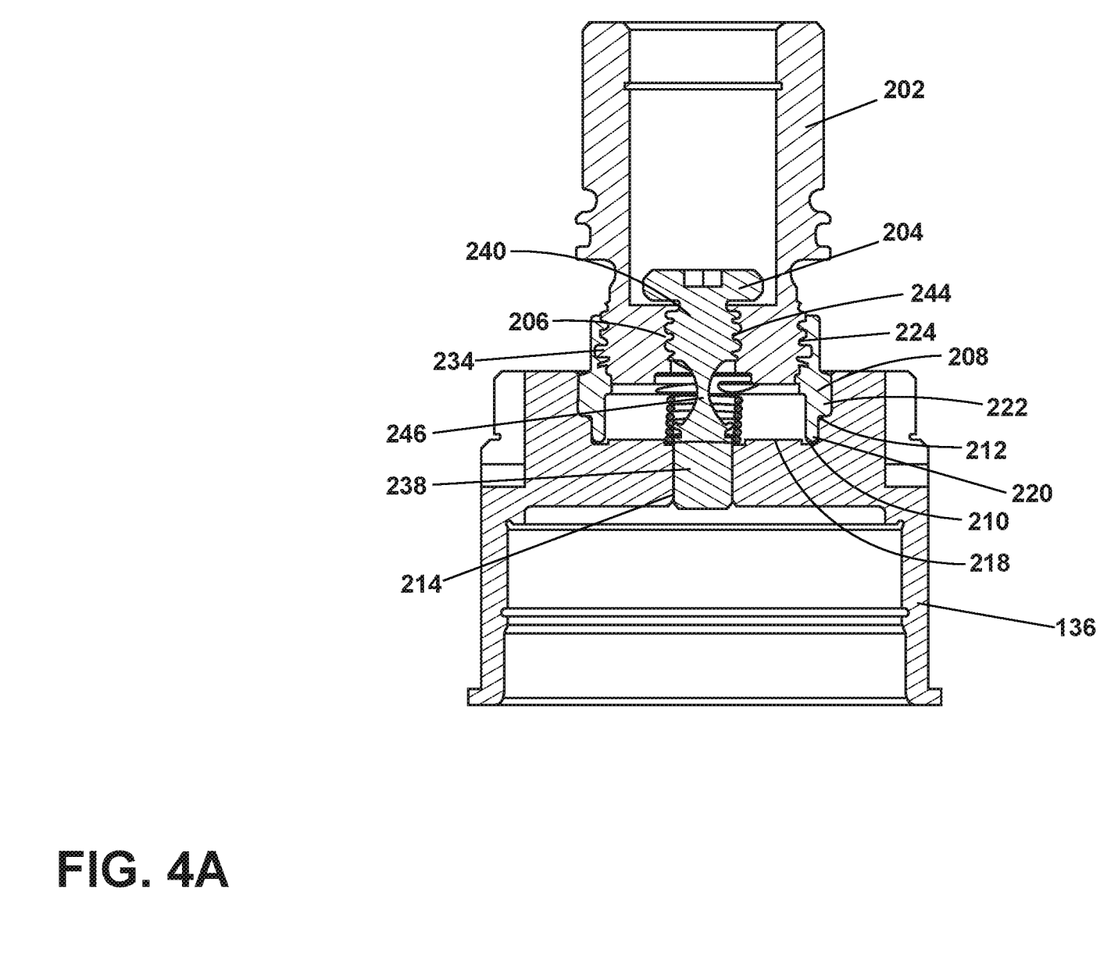
FIG. 4A is a cross-sectional view of the decoupler of FIG. 3 in a first position relative to the rotating shaft, in accordance with various aspects described herein.

FIG. 4A illustrates the decoupler assembly 190 mounted with the drive shaft 136. Because the drive shaft 136 and the thread insert 208 have corresponding circular depression 210, orthogonal depressions 212 and circular protrusion 220 and orthogonal portions 222, respectively, they can be operably coupled. Likewise, the complementary shapes of the stop 218 and 236 operably couple the drive shaft 136 to the output shaft 202. It should be understood that the shapes of the depressions and corresponding receiving portions depicted as orthogonal and circular and the shapes of the complementary stops are for illustrative purposes and not meant to be limiting.

A biasing mechanism can be included between the thread insert 208 and the drive shaft 136. In the illustrated example, the biasing mechanism is the compression spring 217.

A load path can go through mating stop features including the stops 218, 236 and transmit a driving torque. Under normal operating conditions the driving torque is transmitted from the drive shaft 136 of the clutch 132 to the output shaft 202 to drive the engine 1 by the mating stop features 218, 236. The load path leaves the threaded portions, 206, 224, 234, 244, the tensile fuse 204, and the retainer pin 239 unloaded.

Figure 4B:
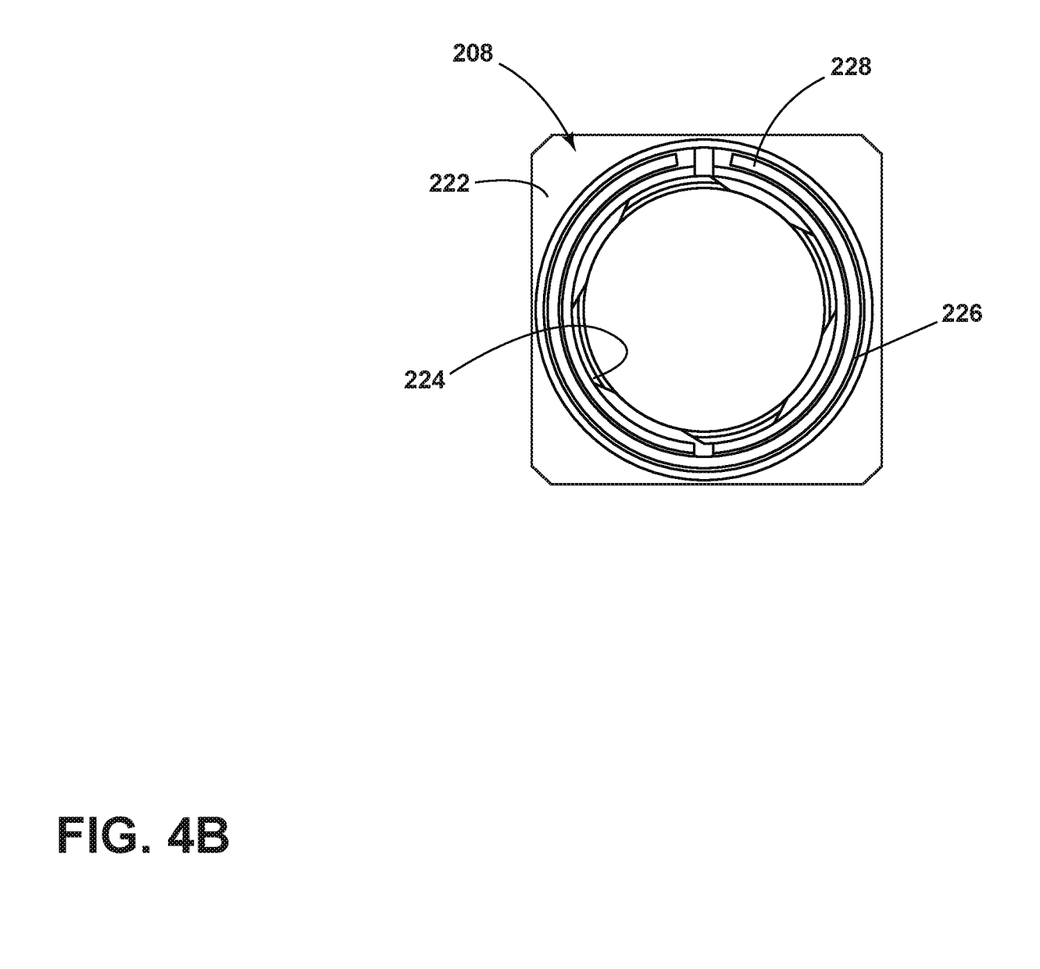
FIG. 4B is a top view of the decoupler of FIG. 3 in a first position relative to the rotating shaft, in accordance with various aspects described herein.

A top view of the thread insert 208 in FIG. 4B illustrates the ring spring 228. Under normal operating conditions the threads of the exteriorly threaded portion 234 push the ring spring 228 outward into an inner portion 226 of the thread insert 208 in an expanded position.

When the clutch 132 becomes disengaged and the engine 1 transmits an overrunning torque, having a magnitude below a certain level, to the air turbine starter 102 the mating stop features 218, 236 become unloaded while the threaded portions, 206, 224, 234, 244, the tensile fuse 204, and retainer pin 239 become partially loaded.

Figure 5A:
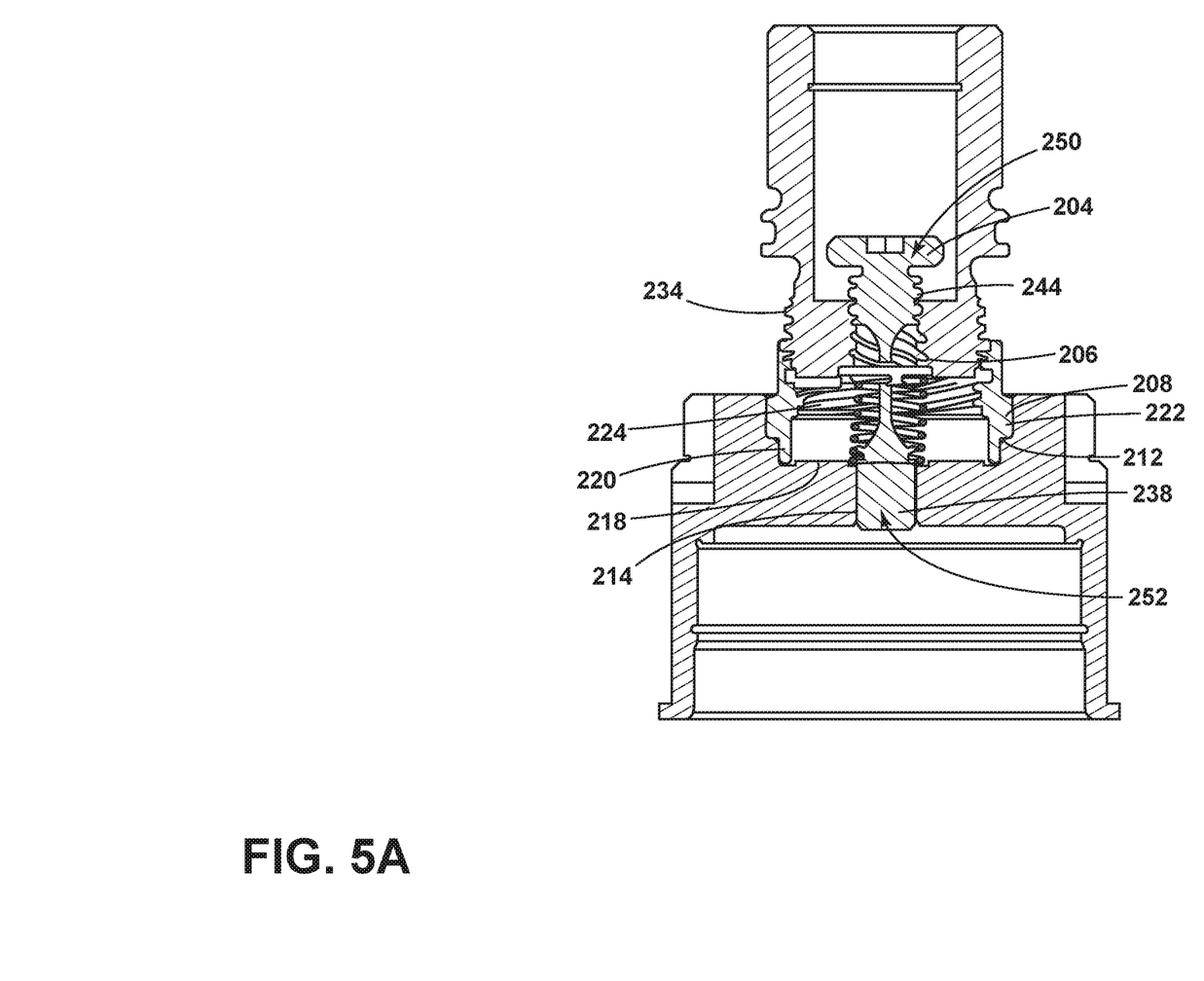
FIG. 5A is a cross-sectional view of the decoupler of FIG. 3 in a second position relative to the rotating shaft, in accordance with various aspects described herein.

Turning to FIG. 5A, in the event of a backdrive which can occur when the clutch 132 fails, the air turbine starter 102 decouples its load path so that components of the gear box 101 and starter 102 are disconnected from the engine 1. The failing clutch 132 becomes engaged or locked while the engine 1 transmits an overrunning torque, with a magnitude of torque at or above the certain level, to the air turbine starter 102. This can also be considered a back driving torque.

In the case of the locked clutch, the backdrive decoupler 200 would be exposed to enough drag torque that the output shaft 202 would unwind from the drive shaft 136, and to simultaneously unwind the tensile fuse 204 from the output shaft 202. The thread ratios between the internal threaded portion 206 and the threaded portion 244 for the tensile fuse 204 compared to those between the internal threaded portion 224 and the threaded portion 234 for the output shaft 202 allow for the tensile fuse 204 to translate two times the translation distance of the output shaft 202, contributing to a high strain on the neck portion 246, causing it to shear and creating a sheared portion 250 and a base 252. The sheared portion 250 of the tensile fuse 204 is unwound from the output shaft 202 leaving the base 252 retained by the retainer pin 239.

The unwinding of the output shaft 202 is further aided by the compressive spring 217. When the output shaft 202 begins to unwind, the compressive spring 217 is configured to expand and bias the output shaft 202 away from the drive shaft 136. It will be understood that any suitable biasing mechanism can be utilized and that the compressive spring is one illustrated example.

Figure 5B:
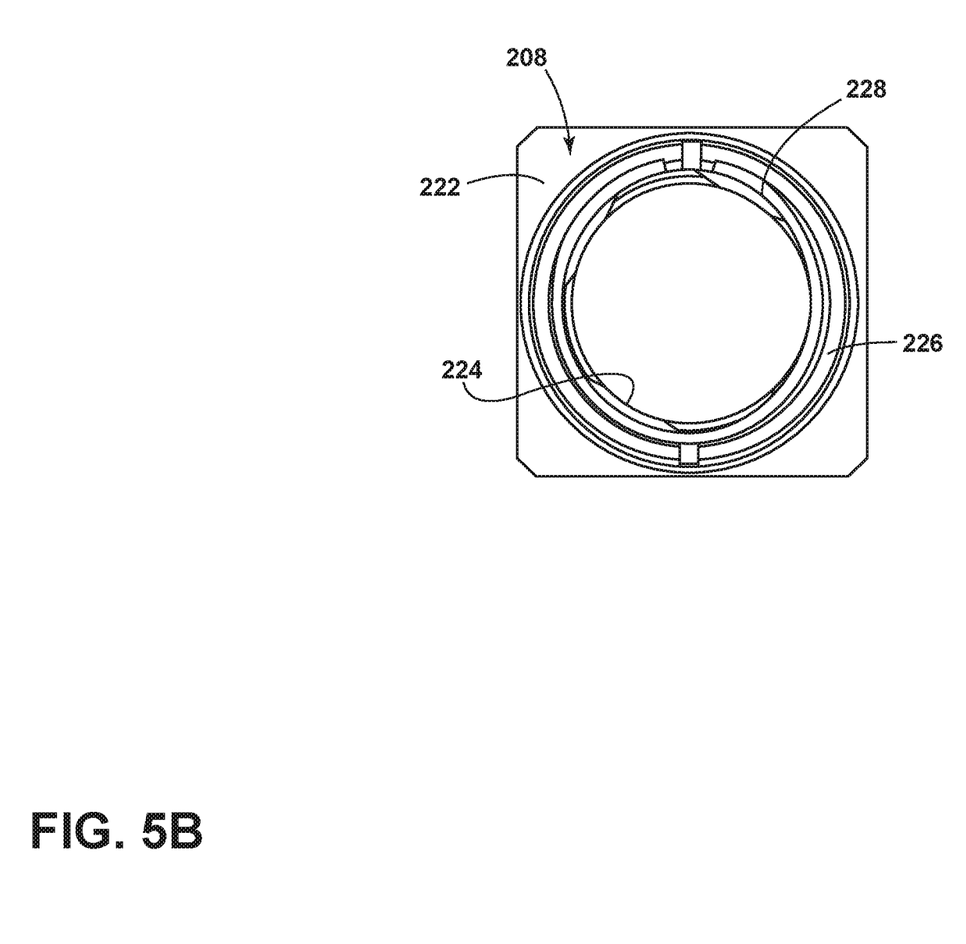
FIG. 5B is a top view of the decoupler of FIG. 3 in a second position relative to the rotating shaft, in accordance with various aspects described herein.

A top view of the thread insert 208 in FIG. 5B illustrates the movement of the ring spring 228 in the event of a back drive. Because the output shaft 202 has translated, the threads of the exteriorly threaded portion 234 are no longer pushing the ring spring 228 outward. This allows the ring spring 228 to compress to a retracted position where the ring spring 228 overlies a portion of the thread insert 208 preventing rethreading of the first end 230 of the output shaft 202 and the thread insert 208. In this manner, the ring spring 228 is configured to secure the output shaft 202 in a decoupled and separate position from the drive shaft 136.

Figure 6:
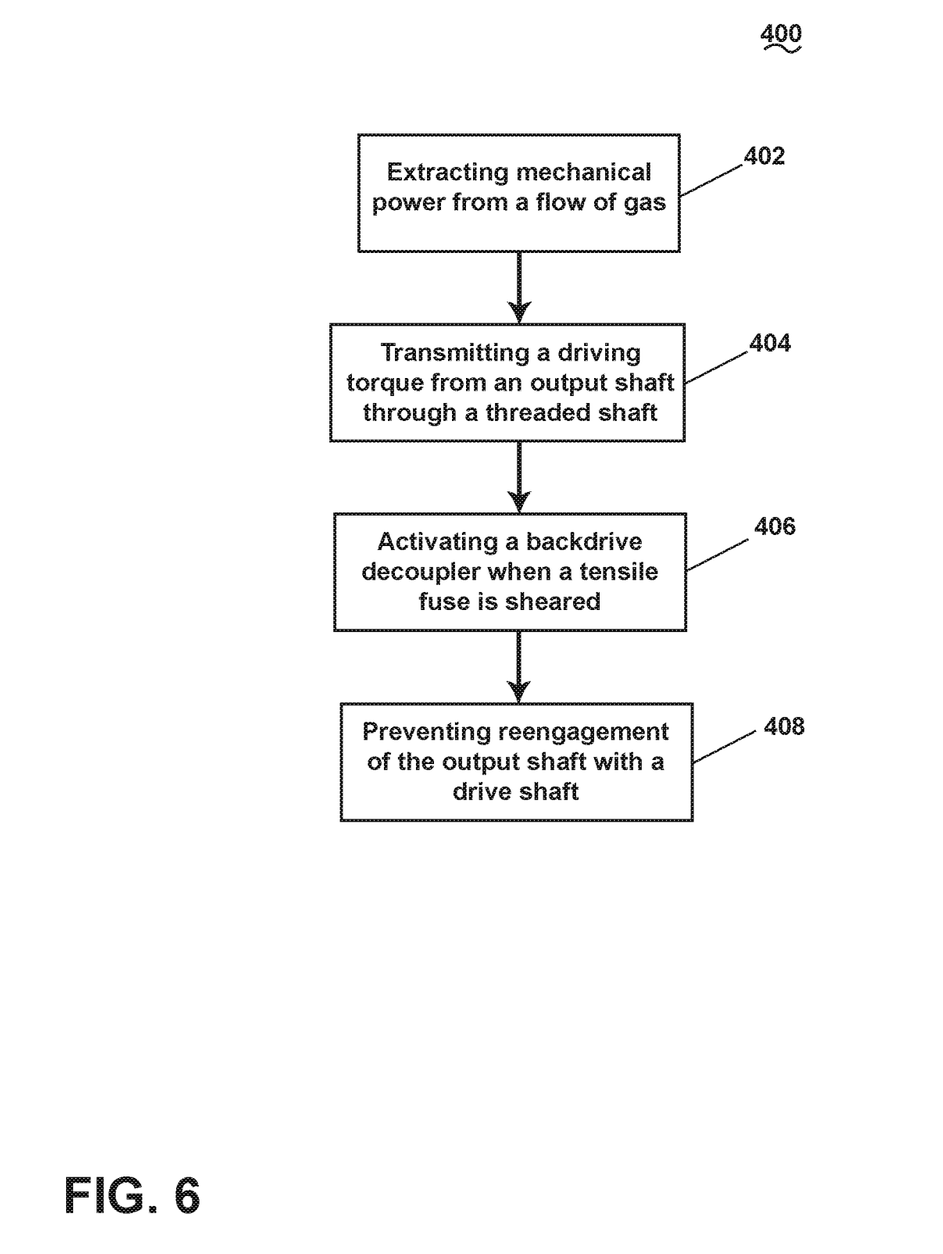
FIG. 6 is a flow chart of a method for operating an air turbine starter.

A method 400 for operating an air turbine starter 102 is outlined in a flow chart in FIG. 6. The method 400 begins at 402 with extracting mechanical power from a flow of gas utilizing a turbine 116 and driving the gear train 118 and clutch 132, including the drive shaft 136. At 404 a driving torque is transmitted from the drive shaft 136 to an output shaft 202 which is operably coupled to the engine 1.

In the case of back driving at 406 the backdrive decoupler 200 is activated when the tensile fuse 204 that is operably coupled to both the output shaft 202 and the drive shaft 136 is sheared. The sheared portion 250 of the tensile fuse 204 is then unwound from the output shaft 202 and translated away from the drive shaft 136. The output shaft 202 is unwound from the drive shaft 136 and translated away from the drive shaft 136.

At 408 the output shaft 202 is prevented from reengaging the drive shaft 136 when the ring spring 228 contracts. The contraction of the ring spring 228 prevents the output shaft 202 from reengaging by blocking the internal helical threaded portion 224 from receiving the exteriorly threaded portion 234. The compression spring 217 is a secondary mechanism that also prevents reengagement when it has sprung. The springing of the compression spring 217 biases the output shaft 202 out and away from the drive shaft 136. The air turbine starter 102 is therefore disabled after decoupling, which prevents an additional engine start.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

The aspects of the present disclosure provide a decoupler for decoupling a torque load coming from the gear train of an engine to prevent backdriving of the entire air turbine starter. Benefits associated with this decoupling include reducing the risk of spinning a damaged air turbine starter which could cause additional damage to the air turbine starter if not decoupled. Further still, the decoupling results in only the tensile fuse being needed to be replaced instead of more costly parts damaged by the continued backdriving.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A decoupler assembly for decoupling an output shaft of a starter motor during backdrive, comprising:
   a fuse having a first end operably coupled to a drive shaft of the starter motor, a threaded portion receivable within an internal threaded portion of the output shaft of the starter motor, and a neck portion located between the first end and the threaded portion;
   wherein when an overrunning torque reaches a certain level the threaded portion of the fuse is unwound from the internal threaded portion in a direction away from the drive shaft.

2. The decoupler of claim 1, wherein the fuse shears at the neck portion when the threaded portion of the fuse is unwound from the internal threaded portion.

3. The decoupler of claim 2, further comprising a thread insert operably coupled to the drive shaft and having a threaded portion that receives a threaded portion of the output shaft of the starter motor.

4. The decoupler of claim 3, wherein the fuse is threaded into the output shaft with an opposite hand turn to the threads between the output shaft and the thread insert.

5. The decoupler of claim 4, wherein when the overrunning torque reaches the certain level the output shaft is unthreaded from the thread insert such that the output shaft is uncoupled from the drive shaft when the fuse is unwound from the output shaft.

6. The decoupler of claim 5, further comprising a blocking mechanism movable between an expanded position and a retracted position and configured to bar the output shaft from rethreading with the thread insert when in the retracted position.

7. The decoupler of claim 1, wherein when a driving torque is transmitted from the drive shaft to the output shaft the fuse is not loaded and when an overrunning torque is transmitted below a certain level the fuse is partially loaded.

8. An air turbine starter for starting an engine, comprising:
   a housing defining an inlet, an outlet, and a flow path extending between the inlet and the outlet for communicating a flow of gas therethrough;
   a turbine member journaled within the housing and disposed within the flow path for rotatably extracting mechanical power from the flow of gas;
   a gear train drivingly coupled with the turbine member;
   a clutch having a drive shaft operably coupled with the gear train; and
   a decoupler, comprising:
      a tensile fuse having a first end operably coupled to the drive shaft, a threaded portion, and a neck portion; and
      an output shaft having a first end selectively operably coupled to the drive shaft, a second end configured to be operably coupled to and rotate with the engine, and an internal threaded portion that receives the threaded portion of the tensile fuse;
   wherein when an overrunning torque reaches a certain level the threaded portion of the tensile fuse is unwound from the internal threaded portion in a direction away from the drive shaft.

9. The air turbine starter of claim 8, wherein the neck portion has a reduced diameter located between the first end and the threaded portion.

10. The air turbine starter of claim 9, wherein the tensile fuse shears at the neck portion when the threaded portion of the tensile fuse is unwound from the internal threaded portion.

11. The air turbine starter of claim 10, further comprising a thread insert operably coupled to the drive shaft and having a threaded portion that receives an exteriorly threaded portion of the first end of the output shaft.

12. The air turbine starter of claim 11, wherein when the overrunning torque reaches the certain level the output shaft is unthreaded from the thread insert such that the output shaft is uncoupled from the drive shaft when the tensile fuse is unwound from the output shaft.

13. The air turbine starter of claim 12, further comprising a biasing mechanism movable between a retracted position and an expanded position located between the drive shaft and the output shaft and configured to bias the output shaft away from the drive shaft when in the expanded position.

14. The air turbine starter of claim 13, further comprising a retainer pin retaining the first end of the tensile fuse within the drive shaft.

15. The air turbine starter of claim 14, further comprising a blocking mechanism movable between an expanded position and a retracted position and configured to bar the output shaft from rethreading with the thread insert when in the retracted position.

16. The air turbine starter of claim 8, wherein when a driving torque is transmitted from the drive shaft to the output shaft the tensile fuse is not loaded and when an overrunning torque is transmitted below a certain level the tensile fuse is partially loaded.

17. A method for operating a starter motor, comprising:
extracting mechanical power from a flow of gas utilizing a turbine and driving a gear train and clutch having a drive shaft therewith;
transmitting a driving torque from the drive shaft to an output shaft operably coupled to an engine; and
during back driving, activating a backdrive decoupler wherein a tensile fuse operably coupled to the output shaft and the drive shaft is unwound from the output shaft and translated away from the drive shaft.

18. The method of claim 17, wherein when the tensile fuse is unwound from the output shaft the tensile fuse becomes sheared and a sheared portion of the tensile fuse is translated away from the drive shaft.

19. The method of claim 18, wherein the output shaft is unwound from the drive shaft and translated away from the drive shaft.

20. The method of claim 19, further comprising preventing the output shaft from reengaging the drive shaft such that the starter motor is disabled after decoupling, which prevents an additional engine start.

* * * * *